United States Patent
Hayashi et al.

(10) Patent No.: US 8,576,685 B2
(45) Date of Patent: Nov. 5, 2013

(54) OBJECTIVE LENS ELEMENT

(75) Inventors: Katsuhiko Hayashi, Nara (JP);
Yasuhiro Tanaka, Hyogo (JP);
Michihiro Yamagata, Osaka (JP)

(73) Assignee: Panasonic Corporation, Kadoma-shi (JP)

( * ) Notice: Subject to any disclaimer, the term of this patent is extended or adjusted under 35 U.S.C. 154(b) by 0 days.

(21) Appl. No.: 13/411,653

(22) Filed: Mar. 5, 2012

(65) Prior Publication Data

US 2012/0163156 A1 Jun. 28, 2012

Related U.S. Application Data

(63) Continuation of application No. PCT/JP2010/005690, filed on Sep. 17, 2010.

(30) Foreign Application Priority Data

Sep. 17, 2009 (JP) ................................ 2009-216226

(51) Int. Cl.
*G11B 7/00* (2006.01)
(52) U.S. Cl.
USPC .............. 369/112.23; 369/112.01; 369/99
(58) Field of Classification Search
USPC ................ 369/112.01, 112.23, 99, 112.25; 359/642
See application file for complete search history.

(56) References Cited

U.S. PATENT DOCUMENTS

| | | | |
|---|---|---|---|
| 6,791,932 B1 * | 9/2004 | Maruyama | 369/112.05 |
| 6,795,254 B2 * | 9/2004 | Hineno | 359/719 |
| 6,829,209 B1 * | 12/2004 | Tanaka et al. | 369/112.23 |
| 2003/0067861 A1 * | 4/2003 | Kimura | 369/112.26 |
| 2004/0105376 A1 * | 6/2004 | Kubo | 369/112.23 |
| 2008/0180815 A1 * | 7/2008 | Yamagata et al. | 359/719 |
| 2008/0181085 A1 * | 7/2008 | Kimura et al. | 369/112.23 |
| 2009/0285078 A1 * | 11/2009 | Katsuma et al. | 369/112.23 |
| 2010/0020672 A1 * | 1/2010 | Yamagata et al. | 369/112.23 |

FOREIGN PATENT DOCUMENTS

| | | |
|---|---|---|
| JP | 2005-346018 A | 12/2005 |
| JP | 2007-148401 A | 6/2007 |
| JP | 2007-311006 A | 11/2007 |
| JP | 2007-334928 A | 12/2007 |
| JP | 2007-334929 A | 12/2007 |
| JP | 2007-334930 A | 12/2007 |
| JP | 2009-123317 A | 6/2009 |

* cited by examiner

*Primary Examiner* — Thomas Alunkal
(74) *Attorney, Agent, or Firm* — Judge Patent Associates

(57) ABSTRACT

A high-NA and thin objective lens which prevents occurrence of a crack during lens molding and can stably be molded is provided. The present invention is directed to an objective lens having an optical surface having power which is not negative. The objective lens is a single lens and is formed such that a flat portion which is provided at an outer peripheral portion and perpendicular to the optical axis is closer to a disc surface than the position of the top of an exit-side surface of the objective lens and such that the rate of change in sag of the exit-side surface is continuous across the entire region.

4 Claims, 5 Drawing Sheets

-0.1000　　-0.0500　　0.0000　　0.0500　　0.1000

SPHERICAL ABERRATION (mm)

-0.100　　-0.050　　0.000　　0.050　　0.100

SINE CONDITION (mm)

SPHERICAL ABERRATION (mm)

SINE CONDITION (mm)

OBJECTIVE LENS ELEMENT

CROSS-REFERENCE TO RELATED APPLICATION

This application is a U.S. continuation application filed under 35 USC 111(a) claiming benefit under 35 USC 120 and 365(c) of PCT application JP2010/005690, filed Sep. 17, 2010, which claims priority to Japanese Patent Application No. 2009-216226, filed on Sep. 17, 2009. The foregoing applications are hereby incorporated herein by reference.

BACKGROUND OF THE INVENTION

1. Field of the Invention

The present invention relates to an objective lens element for use in an optical pickup device that performs at least one of recording, reproducing, and erasing of information on an optical information storage medium.

2. Description of the Background Art

In recent years, an optical pickup device for high-recording-density optical disc (e.g., Blu-ray Disc (registered trademark)) is desired to be reduced in thickness, similarly to conventional ones used for CD and DVD. Thickness reduction of the optical pickup device results in size reduction and thickness reduction of an apparatus equipped with the optical pickup device, leading to expansion of the range of apparatuses that can be equipped with the optical pickup device.

One of optical components that greatly contribute to the thickness of the optical pickup device is an objective lens. Due to limitations of optical arrangement, the thickness of the objective lens directly influences the thickness of an optical pickup. Thus, in order to achieve thickness reduction of the optical pickup device, it is necessary to reduce the thickness of the objective lens.

In the case of an objective lens for BD, in order to compensate an off-axis aberration and the like in the range of high NA, the lens thickness tends to be large. The expression "the lens thickness is large" means that the on-axis lens thickness is large as compared to that of objective lenses for CD and DVD having relatively low NAs. Hereinafter, a biconvex single lens element which is advantageous in terms of optical performance and cost will be described as an example.

An objective lens optical surface on a light source side has to greatly bend an incident light beam, and thus in general has great power and tends to have a great amount of sag. In addition, an objective lens optical surface on a disc side also has convex power, and thus the lens thickness decreases toward the outer periphery. Here, an optical surface includes a refractive surface formed by an aspheric surface, a diffractive surface, and a phase step surface.

When the lens thickness is reduced as much as possible, a sufficient edge thickness cannot be ensured near the lens effective diameter and at the outer periphery. In addition, unless a certain amount of edge thickness is ensured, a crack occurs during a lens molding process, and stable lens molding is difficult.

For example, Japanese Laid-Open Patent Publication Nos. 2007-334928, 2007-334929, and 2007-334930 disclose technology in which, in a high-NA objective lens, a region thicker than the thickness in the optical axis direction within the effective diameter is provided in an outer peripheral portion outside the effective diameter.

However, the above prior art documents merely disclose objective lenses made of resin, and the disclosed technology cannot be applied to an objective lens made of glass. The reason is that due to the difference in producing method between resin lens and glass lens, methods of machining molds therefor are different from each other. Therefore, a discontinuous surface shape as described in the above prior art documents cannot be applied to a glass lens. In addition, in the above prior art documents, the thickness of the outer peripheral portion in the optical axis direction is increased in order to improve transfer of the mold shape to enhance the lens aberration performance and in order to cause the outer peripheral portion to serve as a member which prevents collision with an optical disc.

SUMMARY OF THE INVENTION

It is an object of the present invention to provide a high-NA and thin objective lens element which prevents occurrence of a crack during molding and can stably be molded.

The present invention is directed to an objective lens element which has, on an incident side and an exit side, optically functional surfaces having rotational symmetry axes and which converges a light beam incident from the incident side. In a ring-shaped region of the optically functional surface on the exit side outside an effective diameter, an outer peripheral portion which protrudes toward a spot side beyond a surface top of the optically functional surface is provided. A rate of change in sag of the optically functional surface on the exit side is continuous across a region from the symmetry axis to an outer periphery.

According to the present invention, a high-NA and thin objective lens element which can stably be molded while preventing occurrence of a crack during molding can be provided.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described in detail with reference to the drawings.

Embodiment 1

Figure 1:
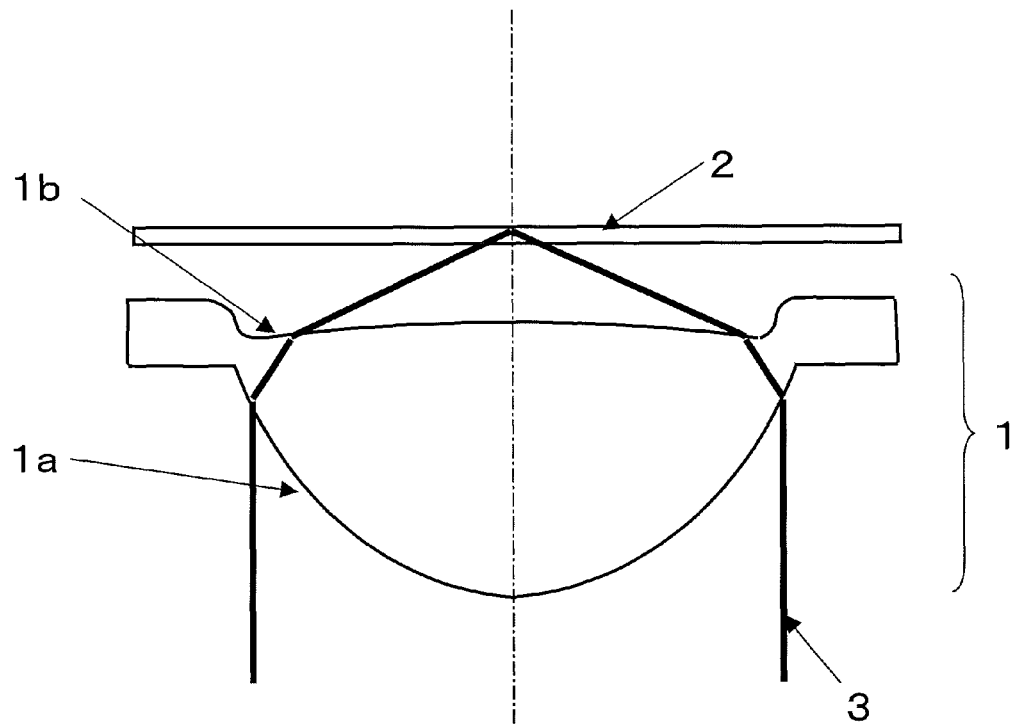
FIG. 1 is a schematic configuration diagram of an objective lens element 1 according to Embodiment 1.

FIG. 1 is a schematic configuration diagram of an objective lens element according to Embodiment 1. The objective lens 1 is used to focus a laser beam on an information recording surface of an information storage medium 2.

Here, the type of the information storage medium 2 is not particularly limited to a specific one. The information storage medium 2 may be an optical disc such as CD (Compact Disc), CD-R (Compact Disc Recordable), CD-RW (Compact Disc ReWritable), CD-ROM (Compact Disc Read Only Memory), DVD (Digital Versatile Disc), DVD-R (Digital Versatile Disc Recordable), DVD-RW (Digital Versatile Disc ReWritable), DVD-ROM (Digital Versatile Disc Read Only Memory), DVD-RAM (Digital Versatile Disc Random Access Memory), EVD (Enhanced Versatile Disc), EVD-R (Enhanced Versatile Disc Recordable), EVD-RW (Enhanced Versatile Disc ReWritable), EVD-ROM (Enhanced Versatile Disc Read Only Memory), EVD-RAM (Enhanced Versatile Disc Random Access Memory), BD(Blu-ray Disc), BD-R (Blu-ray Disc Recordable), BD-RW (Blu-ray Disc ReWritable), BD-ROM (Blu-ray Disc Read Only Memory), and BD-RAM (Blu-ray Disc Random Access Memory), all of which are registered trademarks.

A light beam 3 of a predetermined wavelength (e.g., 408 nm) emitted from a light source (not shown) is converted by a collimating lens (not shown) and the like into substantially parallel light and is incident on the objective lens element 1. The objective lens element 1 is a single lens element which is made of a glass material and has, on an incident side and an exit side, two different aspheric surfaces 1a and 1b having positive power. Each of the aspheric surfaces 1a and 1b is an optically functional surface having a rotational symmetry axis which is the optical axis. The light beam 3 is incident on the aspheric surface 1a and emitted from the aspheric surface 1b. The emitted light beam 3 is converged on the information recording surface of the optical information storage medium 2 to form a desired spot. In addition, the light beam 3 reflected by the information recording surface is incident on the aspheric surface 1b of the objective lens element 1, is emitted from the other aspheric surface 1a, is incident as substantially parallel light on the collimating lens and the like again, and is converted by a detector (not shown) into an electric signal to be detected as a signal.

Here, the shape of the objective lens element 1 will be described in detail. Each of the aspheric surface 1a, which is a first optically functional surface, and the aspheric surface 1b, which is a second optically functional surface, has a convex shape having positive power. Thus, the thickness of the objective lens element 1 decreases from the optical axis toward the outer side in the radial direction. In addition, the objective lens element 1 has, in a region outside the effective diameter, a flat portion (edge flat portion) extending in a direction orthogonal to the optical axis. In a region of the exit-side aspheric surface 1b outside the effective diameter, the sag of the aspheric surface 1b is inverted, and thus a sufficient lens thickness is ensured in this region. Moreover, as seen from FIG. 1, a shape in which the end surface of the edge flat portion is located closer to the disc surface than the surface top is provided on the second surface side.

Since, on the second surface side, the region inside the effective diameter and the region outside the effective diameter are connected to each other via a curved surface different from the aspheric surface in the region inside the effective diameter as described above, a sufficient edge thickness can be ensured. This connection portion does not have any step. In addition, the sag of the aspheric surface 1b on the exit side is continuous, and the rate of change in sag with respect to radius (a derivative of sag with radius) is also continuous.

In general, when the center thickness of an objective lens element is very small, the lens thickness near the effective diameter is very small. If the aspheric surface which is the same as that on the inner side is extended in the region outside the effective diameter as normally, the edge thickness disappears or is extremely small, and it is difficult to stably mold the lens.

On the other hand, in the objective lens element 1 according to Embodiment 1, the region of the exit-side surface inside the effective diameter and the region of the exit-side surface outside the effective diameter are connected to each other via the curved surface different from the surface inside the effective diameter. In addition, the sag of the aspheric surface 1b on the exit side is inverted to increase the edge thickness. As a result, a lens which is unlikely to crack during lens molding and is easily molded can be realized.

In the present embodiment, the increasing/decreasing directions of the sag in the outer region of the second surface on the optical information storage medium side are inverted to ensure a sufficient edge thickness. The increasing/decreasing directions of the sag on the first surface side may be inverted for the same purpose. However, in general, the incident-side surface of a high-NA objective lens element tends to be a curved surface having a great rate of change in sag, and hence the difficulty level is high in terms of mold machining. Thus, it is more preferred to invert the sign of the sag in the outer region of the second surface 1b.

In the present embodiment, the objective lens element 1 has the two aspheric surfaces, but is not limited thereto. The optically functional surface of the objective lens element may be a diffractive surface or a phase step surface, or may be divided into concentric ring-shaped regions. In addition, in the present embodiment, only the optical system for BD has been described in detail, but an objective lens element for DVD/CD may be adjacently disposed on the same actuator. The objective lens element illustrated in the present embodiment is dedicated for BD, but may have a compatible function with another optical information storage medium. In the present embodiment, the objective lens element 1 made of glass (Tg: about 500° C.) has been described, but the material thereof is not limited to glass. The objective lens element 1 may be made of resin.

Embodiment 2

Figure 2:
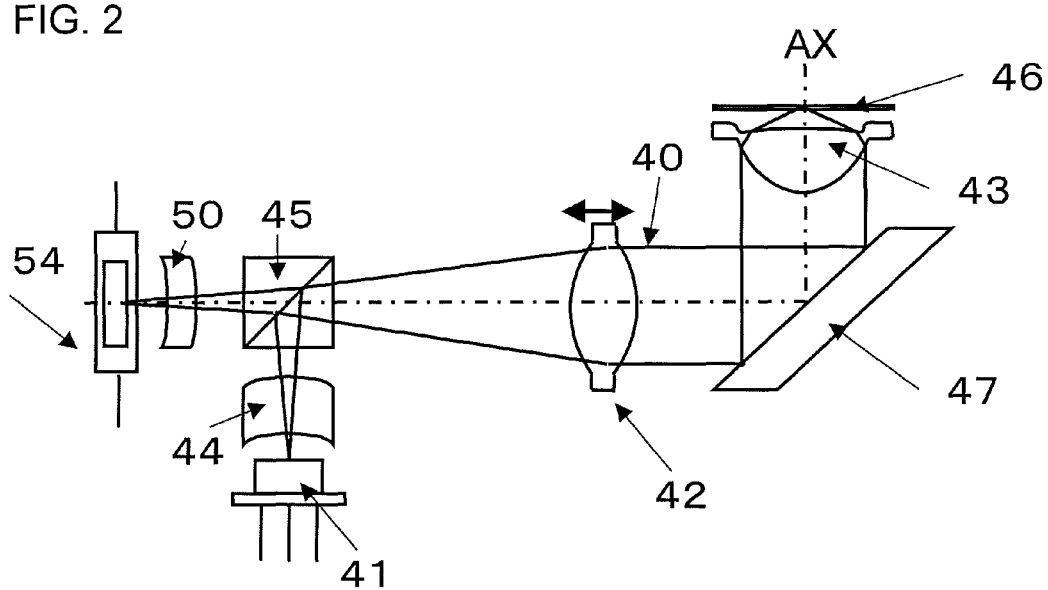
FIG. 2 is a schematic configuration diagram of an optical pickup device according to Embodiment 2.

FIG. 2 is a schematic configuration diagram of an optical pickup device according to Embodiment 2. The optical pickup device according to the present embodiment is reduced in thickness by using a thin objective lens element which can easily be molded.

The optical pickup device according to Embodiment 2 includes a light source 41, a beam shaping lens 44, a beam splitter 45, a collimating lens 42, an upward reflection mirror 47, an objective lens element 43, a detection lens 50, and a detector 54. The light source 41 emits a laser beam (diverging light) of a wavelength corresponding to the type of an information storage medium 46. For example, when the information storage medium 46 is BD (registered trademark), a light source 41 which emits a laser beam of a wavelength of 378 to 438 nm (may be less than 420 nm) is used. When the information storage medium 46 is DVD (registered trademark), a light source 41 which emits a laser beam of a wavelength of 630 to 690 nm is used. When the information storage medium 46 is CD (registered trademark), a light source 41 which emits a laser beam of a wavelength of 750 to 810 nm is used. In addition, for example, when an optical pick-up device having compatibility with three types of optical discs, namely, CD, DVD, and BD, is configured, a light source 41 which selectively emits light of a wavelength corresponding to the type of each optical disc can be used.

The beam shaping lens 44 is disposed in front of the light source 41. The laser beam emitted from the light source 41 is shaped by the beam shaping lens 44 into a desired shape. The laser beam shaped by the beam shaping lens 44 is reflected by a reflecting surface of the beam splitter 45 toward the information storage medium 46. The collimating lens (may be composed of a single lens element or may be composed of a plurality of lens elements) 42 and the objective lens element 43 for focusing a laser beam on each information recording surface of the information storage medium 46 are disposed between the beam splitter 45 and the information storage medium 46.

The objective lens element 43 is the same as that descried in Embodiment 1. The objective lens element 43 is made of a glass material, and both a first surface on an incident side and a second surface on an exit side are aspheric surfaces. A region of the second surface inside the effective diameter is formed by an aspheric surface having positive power, and the lens thickness decreases from the optical axis toward the outer side in the radial direction. In other words, in the region of the second surface inside the effective diameter, the sag monotonically decreases. Here, the sign of the sag of the second surface is set as minus on the light source side and as plus on the information storage medium side. In an outer region of the second surface outside the effective diameter, a curved surface different from the aspheric surface in the region inside the effective diameter is formed, and the lens thickness increases in the optical axis direction. In other words, the sag of the second surface monotonically decreases from the optical axis to the effective diameter, but is inverted near the effective diameter and then monotonically increases. Due to such a shape, a crack can be prevented during lens manufacturing and lens molding can easily be performed.

Further, on the second surface, no step is present in the connection portion between the region inside the effective diameter and the region outside the effective diameter, and the sag is continuous. In addition, the rate of change in sag with respect to radius (a derivative of sag with radius) is also continuous. Moreover, the signs of the rates in sag inside and outside the effective diameter are inverted, and thus a point where the derivative of sag is zero is present near the connection point. The end surface of an edge flat portion provided at the outer peripheral portion protrudes beyond the surface top of the second surface and is closer to the optical disc surface than the surface top.

In the present embodiment, the objective optical system is composed of only the single objective lens element 43. However, according to need, the objective optical system may be composed of a combination of the objective lens element 43 and another one or more optical elements such as a phase compensation element and a beam expander.

The NA of the objective lens element 43 is not particularly limited to a specific value, but is preferably, for example, equal to or higher than 0.8 when the optical pickup device focuses a laser beam on BD (registered trademark) or the like.

The laser beam focused on the information recording surface of the information storage medium 46 by the objective lens element 43 is reflected by the information recording surface. Then, the light reflected by the information recording surface is incident on the detector 54 via the objective lens element 43, the upward reflection mirror 47, the collimating lens 42, and the beam splitter 45, and the detection lens 50.

In the present embodiment, the collimating lens 42 serves as an aberration compensation element, is located at a reference position between the beam splitter 45 and the objective lens element 43, and is configured to be able to shift from the reference position along the optical axis AX. Moreover, in the present embodiment, when the collimating lens 42 which serves as an aberration compensation element is located at the reference position, substantially parallel light is incident on the objective lens element 43.

Here, the example where the collimating lens 42 is used as an aberration compensation element has been described. However, an aberration compensation element may be composed of only a beam expander disposed between the collimating lens and the objective lens or may be composed of a beam expander lens and a collimating lens. In addition, a liquid crystal lens, a liquid lens, or the like may be used as an aberration compensation element.

In the present embodiment, the lens elements other than the objective lens element 43, and the other optical elements, may each be formed by only a refractive surface substantially having only a refraction effect or may each have another optically functional surface such as a diffractive surface or a phase step surface. Moreover, the material of each optical element is not particularly limited to a specific one, and may be, for example, glass or resin.

Further, the optical pickup device may further include, between the light source 41 and the information storage medium 46, an element which substantially does not influence a transmitted wavefront aberration.

In the present embodiment, the optical system for BD has been described as an example. However, the present embodiment is applicable to an optical pickup device of a so-called dual-lens configuration in which, in order for the pick-up device to be able to perform recording and reproducing on other optical discs such as DVD and CD, another lens (or a compatible lens) is mounted on an actuator on which the objective lens element 43 is mounted. In addition, the objective lens according to the present embodiment is made of glass having a Tg of about 500° C., but the material thereof is not limited thereto.

EXAMPLES

Hereinafter, Numerical Examples of the present invention will be specifically described with construction data, aberration diagrams, and the like. It should be noted that in each Numerical Example, a surface to which an aspheric coefficient is provided indicates a refractive optical surface having an aspherical shape or a surface (e.g., a diffractive surface etc.) having a refraction function equal to that of an aspheric surface, and the surface shape of an aspheric surface is defined by the following formula.

$$X = \frac{C_j h^2}{1 + \sqrt{1 - (1+k_j)C_j^2 h^2}} + \sum A_{j,n} h^n$$

Here,

X is the distance from an on-the-aspheric-surface point at a height h relative to the optical axis to a tangential plane at the top of the aspheric surface, h is the height relative to the optical axis, $C_j$ is the radius of curvature at the top of an aspheric surface of a lens jth surface ($C_j=1/R_j$), $K_j$ is the conic constant of the lens jth surface, and $A_{j,n}$ is the nth-order aspheric constant of the lens jth surface.

Numerical Example 1

Tables 1 to 4 below show construction data of an objective lens element according to Numerical Example 1.

TABLE 1

| | |
|---|---|
| Wavelength | 0.406 |
| Diameter of effective aperture | φ1.53 |
| Outer diameter of lens | φ2.00 |
| NA | 0.85 |
| Working distance (WD) | 0.30 |
| Disc thickness (DT) | 0.085 |
| Focal length | 0.90 |

TABLE 2

| Surface No. | Radius of curvature at the top of lens surface | Thickness | Material | Remarks |
|---|---|---|---|---|
| 0 | ∞ | | | |
| 1 | 0.6127781 | 0.7557185 | | Aspherical |
| 2 | −3.691007 | WD | n1 | Aspherical |
| 3 | ∞ | DT | Disc | Planar |
| 4 | ∞ | | | Planar |

TABLE 3

| | |
|---|---|
| Wavelength | 0.406 |
| n1 | 1.62627 |
| Disc | 1.61704 |

TABLE 4

| First surface Region (radius) | Aspherical constants 0 mm to 0.765 mm Aspherical constants |
|---|---|
| RD | 0.6127781 |
| k | −0.5888744 |
| A2 | 0 |
| A4 | 0.069449957 |
| A6 | 0.33012996 |
| A8 | −1.4090015 |
| A10 | 5.951212 |
| A12 | −12.32651 |
| A14 | 13.373617 |
| A16 | −5.8809403 |
| Second surface Region (radius) | Aspherical constants 0 mm to 0.705 mm |
| RD | −3.6910071 |
| k | 0 |
| A2 | 0 |
| A4 | 1.0039995 |
| A6 | −3.3073244 |
| A8 | 6.5531839 |
| A10 | −4.0048836 |
| A12 | −13.503786 |
| A14 | 32.678582 |
| A16 | −22.428138 |
| Second surface Region (radius) | Aspherical constants 0.705 mm to 0.800 mm |
| RD | 1 |
| k | 0 |
| A0 | −0.278 |

In Numerical Example 1, a first surface of the objective lens element is an aspheric surface. A second surface is divided into an inner region including an optical axis and an outer region surrounding the inner region. The inner region is formed by an aspheric surface, and the outer region is formed by a spherical surface. In addition, at the outer peripheral portion of the objective lens element, a flat portion perpendicular to the optical axis is provided. The designed wavelength is 406 nm, the focal distance is 0.9 mm, the numerical aperture (NA) is 0.85, and the protective layer thickness of an information storage medium is 0.085 mm. Here, the reason why the designed protective layer thickness is 0.085 mm is to be compatible with a multilayer disc of BD, and this thickness corresponds to a thickness between the thickest protective layer and the thinnest protective layer. Here, if the aspheric surface of the inner region of the second surface is extended further, only an edge thickness of about 98 μm is ensured, and hence a crack is likely to occur and stable manufacturing is difficult. Thus, the outer region is formed by a curved surface (R=1.0 mm) which is concave in the direction opposite to that of the inner region, to increase the lens thickness. By so doing, an edge thickness of about 166 μm can be ensured, and a lens which can stably be manufactured is provided.

Figure 3:
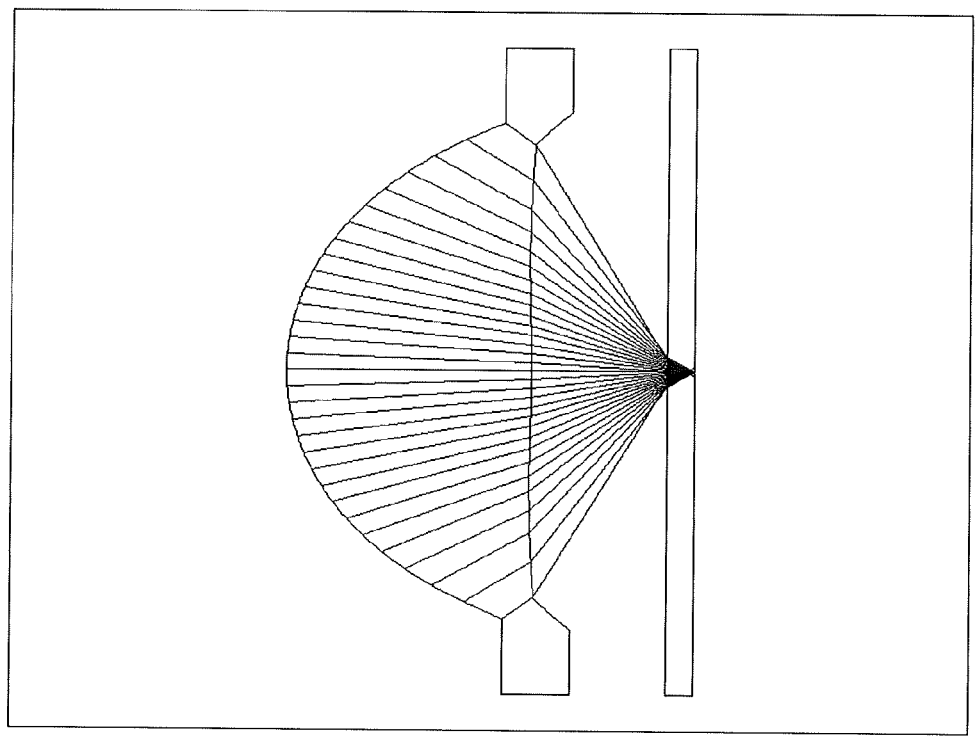
FIG. 3 is an optical path diagram of an objective lens element according to Numerical Example 1.
Figure 4:
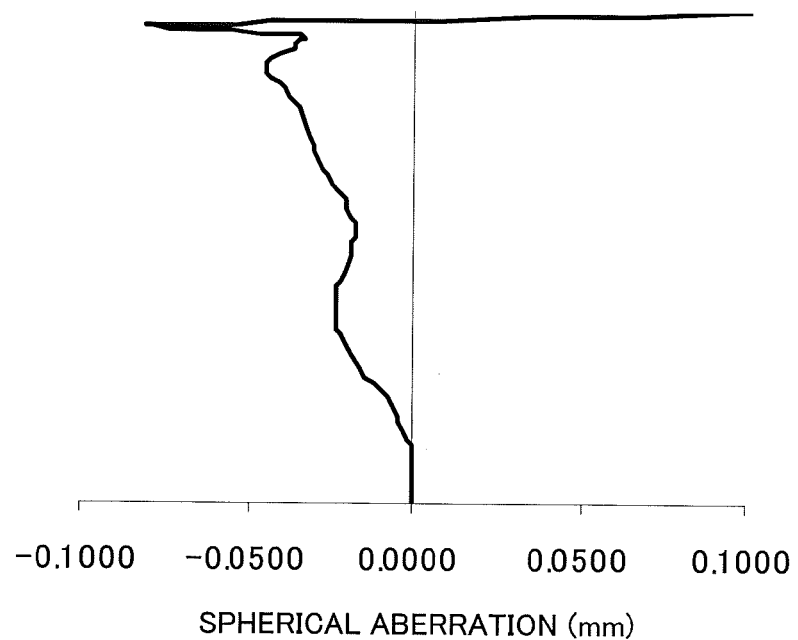
FIG. 4 is a graph showing a spherical aberration of the objective lens element according to Numerical Example 1.
Figure 5:
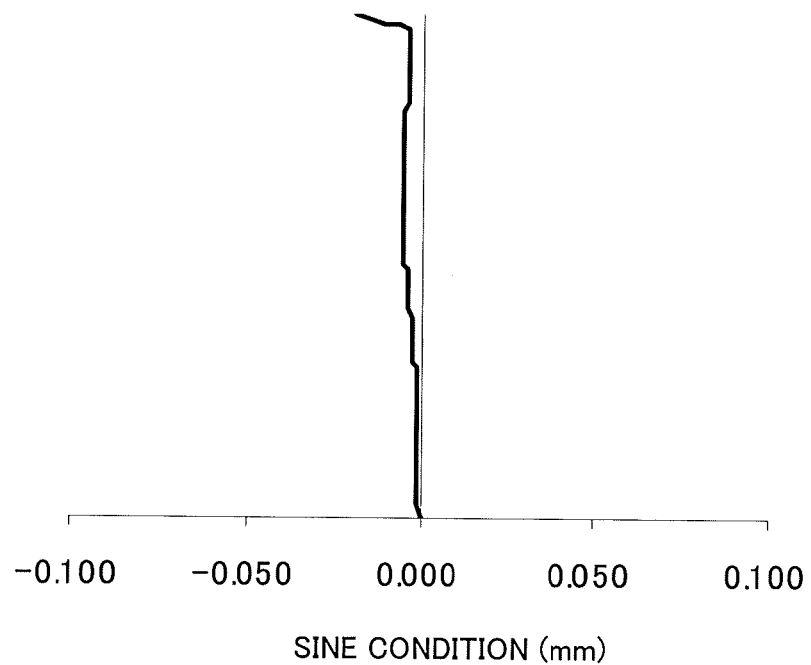
FIG. 5 is a graph showing a dissatisfied amount of a sine condition of the objective lens element according to Numerical Example 1.

FIG. 3 is an optical path diagram of the objective lens element according to Numerical Example 1. FIG. 4 is a graph showing a spherical aberration when parallel light is incident on the objective lens element according to Numerical Example 1. FIG. 5 is a graph showing a sine condition when parallel light is incident on the objective lens element according to Numerical Example 1.

Numerical Example 2

Tables 5 to 8 below show construction data of an objective lens element according to Numerical Example 2.

TABLE 5

| | |
|---|---|
| Wavelength | 0.406 |
| Diameter of effective aperture | φ1.36 |
| Outer diameter of lens | φ2.00 |
| NA | 0.85 |
| Working distance (WD) | 0.25 |
| Disc thickness (DT) | 0.085 |
| Focal length | 0.85 |

TABLE 6

| Surface No. | Radius of curvature at the top of lens surface | Thickness | Material | Remarks |
|---|---|---|---|---|
| 0 | ∞ | | | |
| 1 | 0.5393875 | 0.6958359 | | Aspherical |
| 2 | −3.544079 | WD | n1 | Aspherical |
| 3 | ∞ | DT | Disc | Planar |
| 4 | ∞ | | | Planar |

TABLE 7

| | |
|---|---|
| Wavelength | 0.406 |
| n1 | 1.62627 |
| Disc | 1.61704 |

TABLE 8

| First surface Region (radius) | Aspherical constants 0 mm to 0.68 mm Aspherical |
|---|---|
| RD | 0.5393875 |
| k | −0.5987415 |

TABLE 8-continued

| | |
|---|---|
| A2 | 0 |
| A4 | 0.10536916 |
| A6 | 0.25816977 |
| A8 | −0.69871743 |
| A10 | 5.4107012 |
| A12 | −12.09605 |
| A14 | 14.287296 |
| A16 | −8.0613507 |

| Second surface Region (radius) | Aspherical constants 0 mm to 0.6125 mm |
|---|---|
| RD | −3.5440786 |
| k | 0 |
| A2 | 0 |
| A4 | 1.1380861 |
| A6 | −3.7039172 |
| A8 | 6.55204 |
| A10 | −2.538016 |
| A12 | −13.553431 |
| A14 | 26.675402 |
| A16 | −16.341237 |

| Second surface Region (radius) | Aspherical constants 0.6125 mm to 0.700 mm |
|---|---|
| RD | 0.9 |
| k | 0 |
| A0 | −0.23 |

In Numerical Example 2, the objective lens element is made of a glass material. A first surface of the objective lens element is an aspheric surface. A second surface is divided into an inner region including an optical axis and an outer region surrounding the inner region. The inner region is formed by an aspheric surface, and the outer region is formed by a spherical surface. In addition, at the outer peripheral portion of the objective lens element, a flat portion perpendicular to the optical axis is provided. The designed wavelength is 406 nm, the focal distance is 0.85 mm, the numerical aperture (NA) is 0.85, and the protective layer thickness of an information storage medium is 0.085 mm. Here, the reason why the designed protective layer thickness is 0.085 mm is to be compatible with a multilayer disc of BD, and this thickness corresponds to a thickness between the thickest protective layer and the thinnest protective layer. If the aspheric surface of the inner region of the second surface is extended further, only an edge thickness of about 111 μm is ensured, and hence a shape with which a crack is likely to occur is provided. Thus, by the outer region of the second surface being formed by a curved surface (R=0.9 mm) which is concave in the direction opposite to that of the inner region, an edge thickness of up to 181 μm can be ensured, and a lens shape with which a crack is unlikely to occur is obtained.

Figure 6:
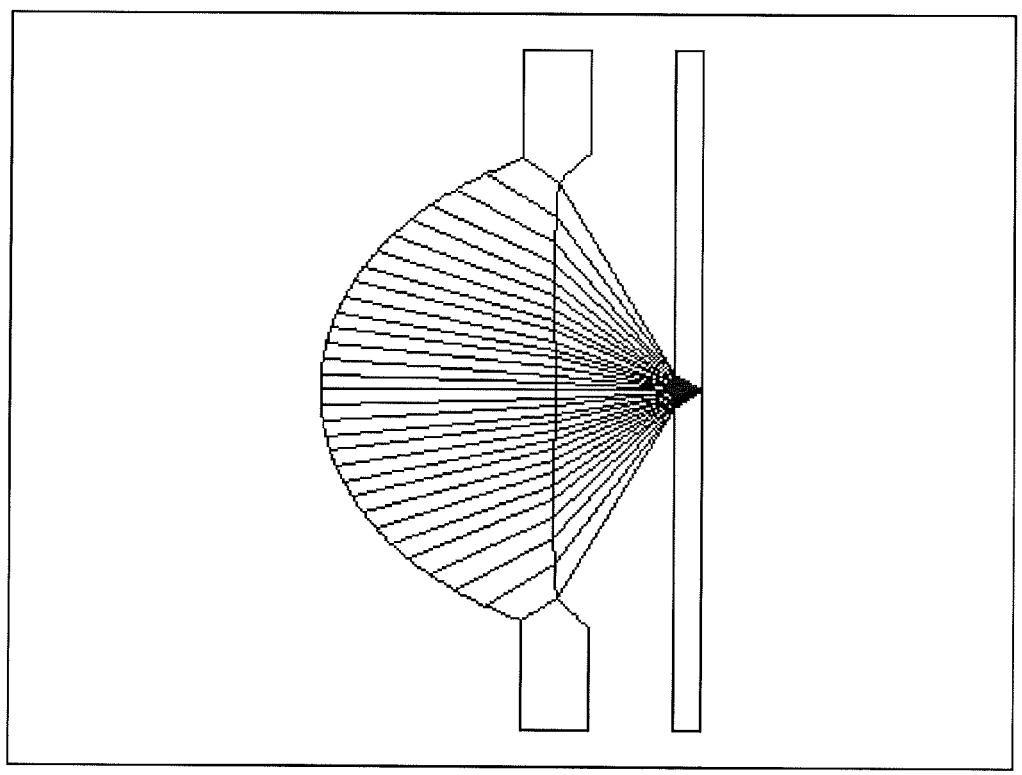
FIG. 6 is an optical path diagram of an objective lens element according to Numerical Example 2.
Figure 7:
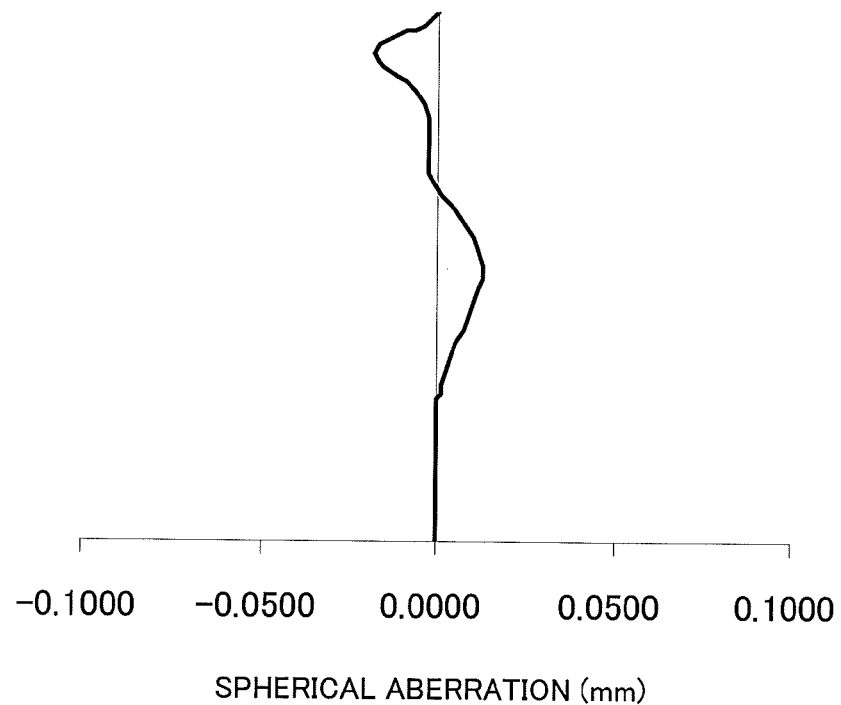
FIG. 7 is a graph showing a spherical aberration of the objective lens element according to Numerical Example 2.
Figure 8:
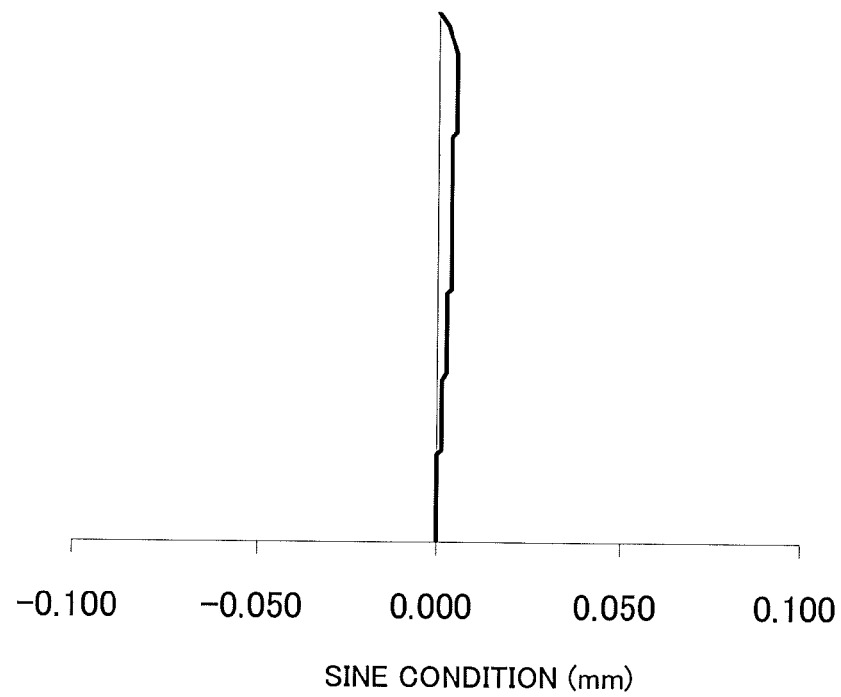
FIG. 8 is an aberration diagram showing a dissatisfied amount of a sine condition of the objective lens element according to Numerical Example 2.

FIG. 6 is an optical path diagram of the objective lens element according to Numerical Example 2. FIG. 7 is a graph showing a spherical aberration when parallel light is incident on the objective lens element according to Numerical Example 1. FIG. 8 is a graph showing a sine condition when parallel light is incident on the objective lens element according to Numerical Example 2.

The present invention allows a high-NA and thin objective lens element to be stably manufactured, and thus can be used for an optical pickup device which performs recording or reproducing on various information storage medium such as CD (Compact Disc), DVD (Digital Versatile Disc), BD (Blu-ray Disc), EVD (Enhanced Versatile Disc), and HD-DVD (High Definition Digital Versatile Disc), and an information apparatus (a computer, etc.), a video apparatus, an audio apparatus, and the like, which employ the optical pickup device.

While the invention has been described in detail, the foregoing description is in all aspects illustrative and not restrictive. It will be understood that numerous other modifications and variations can be devised without departing from the scope of the invention.

What is claimed is:

1. An objective lens element which has, on an incident-side surface and on an exit-side surface, optically functional surfaces having rotational symmetry axes and which converges a light beam incident from the incident-side surface, wherein
in a ring-shaped region of the optically functional surface on the exit-side surface outside an effective diameter, an outer peripheral portion which includes an outer edge of the objective lens and protrudes toward a spot side beyond a surface top of the optically functional surface is provided, and
a rate of change in sag of the exit-side surface inside the effective diameter and a rate of change in sag of the exit-side surface of the outer peripheral portion are continuous across a region from the symmetry axis to the outer edge of the objective lens, the rate of change in sag of the exit-side surface being the derivative of sag with respect to the exit-side radius of the objective lens.

2. The objective lens element according to claim 1, wherein a thickness in an optical axis direction of a region outside the effective diameter is larger than a thickness in the optical axis direction of an outermost peripheral region inside the effective diameter.

3. The objective lens element according to claim 1, wherein increasing/decreasing directions of the sag are inverted in the region of the optically functional surface on the exit-side surface outside the effective diameter.

4. The objective lens element according to claim 1, wherein the exit-side surface includes an inner region inside the effective diameter and an outer region outside the effective diameter, and
the inner region of the exit-side surface is connected to the outer region of the exit-side surface via a curved surface.

* * * * *